(12) United States Patent
Whipple

(10) Patent No.: US 7,661,915 B2
(45) Date of Patent: Feb. 16, 2010

(54) TRAPEZE HANGER

(76) Inventor: Charles E. Whipple, 120 Sheffield Dr., Collierville, TN (US) 38017-4246

( * ) Notice: Subject to any disclaimer, the term of this patent is extended or adjusted under 35 U.S.C. 154(b) by 418 days.

(21) Appl. No.: 11/541,751

(22) Filed: Oct. 2, 2006

(65) Prior Publication Data

US 2008/0080956 A1 Apr. 3, 2008

(51) Int. Cl.
*F16B 39/24* (2006.01)
(52) U.S. Cl. .................. 411/151; 411/432; 411/433; 411/540
(58) Field of Classification Search ............... 411/147, 411/151, 432–434, 540
See application file for complete search history.

(56) References Cited

U.S. PATENT DOCUMENTS

| | | | |
|---|---|---|---|
| 663,208 A | 12/1900 | Wrensch | |
| 1,450,014 A | 3/1923 | Berglof | |
| 1,510,492 A * | 10/1924 | Caron et al. | 411/432 |
| 1,777,614 A | 10/1930 | Hauger | |
| 2,377,581 A | 6/1945 | Shaffrey | |
| 3,815,434 A | 6/1974 | Seger | |
| 4,026,341 A | 5/1977 | Menke | |
| 4,078,470 A | 3/1978 | Zeranick, Jr. et al. | |
| 4,083,288 A | 4/1978 | Williams | |
| 4,132,146 A * | 1/1979 | Uhlig | 411/433 |
| 4,166,708 A | 9/1979 | Lafferty, Sr. | |
| 4,274,323 A | 6/1981 | Resnicow | |
| 4,405,274 A | 9/1983 | Saitoh et al. | |
| 4,462,731 A | 7/1984 | Rovinsky et al. | |
| 4,556,352 A | 12/1985 | Resnicow | |
| 4,557,652 A | 12/1985 | Lundgren | |
| 4,591,288 A | 5/1986 | Schmidek et al. | |
| 4,657,458 A | 4/1987 | Woller et al. | |
| 4,659,273 A | 4/1987 | Dudley | |
| 4,784,412 A | 11/1988 | Van Dongen | |
| 4,826,376 A * | 5/1989 | Aldridge et al. | 411/237 |
| 4,863,198 A | 9/1989 | Petranto | |
| 4,901,958 A | 2/1990 | Kelso | |
| 4,930,961 A | 6/1990 | Weis | |
| 5,000,640 A | 3/1991 | Haas, Jr. | |
| 5,039,266 A | 8/1991 | Nagayoshi et al. | |
| 5,044,854 A | 9/1991 | Oh | |
| 5,090,854 A | 2/1992 | Hafeli et al. | |
| 5,102,074 A | 4/1992 | Okada | |
| 5,106,252 A | 4/1992 | Shapton | |
| 5,110,074 A | 5/1992 | Deguchi | |
| 5,111,879 A | 5/1992 | Jozwiak et al. | |
| 5,199,675 A | 4/1993 | DeGuchi | |

(Continued)

OTHER PUBLICATIONS

Thomas & Betts Superstrut Manual, effective Sep. 2005—www.tnb.com0577.

*Primary Examiner*—Gary Estremsky
(74) *Attorney, Agent, or Firm*—Hoffmann & Baron, LLP

(57) ABSTRACT

An interlocking suspension support hanger for mounting strut members off of a vertical threaded rod includes a pair of support hanger having a rectangular support body with a pivoting pin hole and a fastening pin hole on the support body and a recess opening leading to a center thread configured to fit around the vertical threaded rod. Further, a process for utilizing the support hanger to suspend a strut rack assembly from the vertically threaded rod without passing the assembly over the ends of the rod or removing the existing strut rack is disclosed.

18 Claims, 5 Drawing Sheets

U.S. PATENT DOCUMENTS

| | | |
|---|---|---|
| 5,226,678 A | 7/1993 | Petranto |
| 5,277,459 A | 1/1994 | Braun et al. |
| 5,377,395 A | 1/1995 | Maier et al. |
| 5,406,032 A | 4/1995 | Clayton et al. |
| 5,779,418 A * | 7/1998 | Ying-Che ............... 411/433 |
| 5,921,734 A | 7/1999 | Kataoka |
| 6,050,766 A | 4/2000 | Kies et al. |
| 6,053,655 A | 4/2000 | Mazhar |
| 6,287,065 B1 | 9/2001 | Berlin |
| 6,488,461 B1 | 12/2002 | Zacharias et al. |
| 6,530,714 B2 | 3/2003 | Schwarz |
| 6,533,516 B2 | 3/2003 | Lemelin |
| 6,581,884 B1 | 6/2003 | Gretz |
| 6,666,637 B1 | 12/2003 | Sun |
| 6,666,639 B2 | 12/2003 | Van Gent |
| D484,778 S | 1/2004 | French |
| 6,739,813 B1 | 5/2004 | Gundy et al. |
| 6,799,930 B1 | 10/2004 | More et al. |
| 6,821,070 B1 | 11/2004 | Thompson |
| 6,845,644 B1 | 1/2005 | Buckner |
| 6,896,226 B2 | 5/2005 | Heath |
| 6,971,623 B2 | 12/2005 | Allmon et al. |
| D557,594 S * | 12/2007 | Whipple ............... D8/373 |
| 2004/0067120 A1 | 4/2004 | Speer |
| 2004/0228700 A1 | 11/2004 | Clinch et al. |
| 2005/0239609 A1 | 10/2005 | Chen |

* cited by examiner

TRAPEZE HANGER

FIELD OF THE INVENTION

This invention relates to suspended strut members and supports therefore. More particularly, the present invention relates to a method and apparatus for suspending additional strut members from a threaded rod that already has other strut members suspended, without removing the existing strut members.

BACKGROUND OF THE INVENTION

In architectural settings, it is often necessary to improve architectural structures by adding, changing or removing certain portions. Such architectural improvements and additions are constantly being made in commercial and industrial settings. More specifically, in many commercial and industrial settings, changes need to be made in modular, steel, aluminum, and fiberglass reinforced plastic framing products and accessories suitable for electrical, industrial, construction and other applications without welding or performing other permanent changes. One of the common problems encountered in changing the modular form of the architectural construction is the removal or addition of horizontal members to the existing threaded rod assemblies. To effectively add or remove horizontal members to existing threaded rod assemblies, such procedure requires the whole assembly to be removed and a new assembly to be installed. Then, the original assembly will be reinstalled, which is very labor intensive, and adds a substantial cost to a work project.

A strut system is a system of horizontally placed channeled strut members suspended from the ceiling on a plurality of vertical threaded rods. The channel strut member has a plurality of holes through which the vertical rods are received as the strut member is raised to the proper elevation. A washer and a threaded nut are run up on the rod to engage the bottom of the strut member or the top of the strut member and support the strut member on the rod. Pipes or electrical cables are supported horizontally on these pipe rack strut members and run horizontally overhead throughout the building.

When architectural improvements, additions or removals require new pipe or electrical hookups, or rerouting, the suspended pipes or electrical cables must be removed or replaced, or new ones added. This procedure often requires expensive periods of shutdowns while the pipe racks are disassembled. In some cases, a second layer or intermediate pipe rack may be installed above the existing one to allow placement of the new pipe or cable before the old ones are removed.

For instance, to install an intermediate pipe rack above an existing one, it is necessary to remove the old strut members from the vertical threaded rod, or to take off the nut and lower the strut members. The intermediate strut member must then be forced over the existing pipe and cable which often requires bending or cutting an existing support rod to allow the intermediate strut member to fit on the rods above the pipe and cable. Then the old lower strut member must be put back into position. This threading procedure alone takes many hours.

One solution has been to provide a split nut device, which can be assembled onsite to support strut members. Various split nut configurations, although not utilized to support strut members, are known in the art. Specifically, there are several patents which disclose various split nut configurations.

For example, U.S. Pat. No. 663,208 to Wrensch discloses a pair of nut sections, each having a central threaded perforation, wherein the nut sections are hinged together at one side and joined together at other side by a screw. As can be seen, each nut section is not identical with the other. Further two different parts are required for the fastener and the hinge portions.

U.S. Pat. No. 4,132,146 to Uhlig discloses a swivel nut assembly formed from a pair of pivotally interconnected U-shaped disks, each disk forming a U-shaped recess. Two separate parts which are distinct from each other are required for the fastener and the hinge portions.

U.S. Pat. No. 4,901,958 to Kelso discloses an interlocking pipe rack assembly including two elongate separate strut members with a fastening means. However, the fastening means does not disclose any simple manufacturing part nor does it disclose an interchangeable hinge-fastening portion.

Thus, none of these references offer a simple to manufacture device which is easy to install on a threaded rod with existing strut members. Therefore, a need exists which overcomes all of the shortcomings of the prior art references known in the art.

SUMMARY OF THE INVENTION

The present invention provides for a hanger for supporting a strut to a threaded support rod extending through the strut. The hanger includes a pair of planar hanger portions, each hanger portion including an access opening extending from a side edge thereof and including an internally threaded portion for insertable accommodation of the threaded rod. The hanger portions are pivotally interconnected defining an open position for placement about the threaded rod and a closed position defining a threaded aperture for threadedly receiving the rod. The hanger portions in the closed position is rotatably movable along the rod for supporting engagement with the strut, and the hanger portions are identically shaped.

In addition, the present invention provides for a trapeze hanger which includes a pivot pin and a fastening pin. Each of the hanger portions includes a pin hole to allow the hanger portions to pivot against each other. Further, each of the hanger portions includes a second pin hole for fastening the hanger portions with each other at a clasped position around the threaded rod. The invention provides for a same pin profile to be used interchangeably as a fastener and a hinge for assembly.

Further, the present invention also provides for a method for supporting a strut having a threaded rod extending therethrough. The method includes providing a pair of pivotally connected planar hanger portions, each hanger portion including an access opening extending from a side edge to a threaded internal portion, pivoting the hanger portions about the threaded rod to place the hanger portions in threaded engagement with the rod, and rotating the pair of hanger portions into supporting engagement with the strut.

BRIEF DESCRIPTION OF THE DRAWINGS

In the following, the present invention will be described with reference to the figures of the drawings wherein.

DETAILED DESCRIPTION OF PREFERRED EMBODIMENTS

Although the following description describes the invention as being utilized particularly in suspended strut rack installations, it should be understood that the apparatus may be used in various other construction applications.

Figure 1:
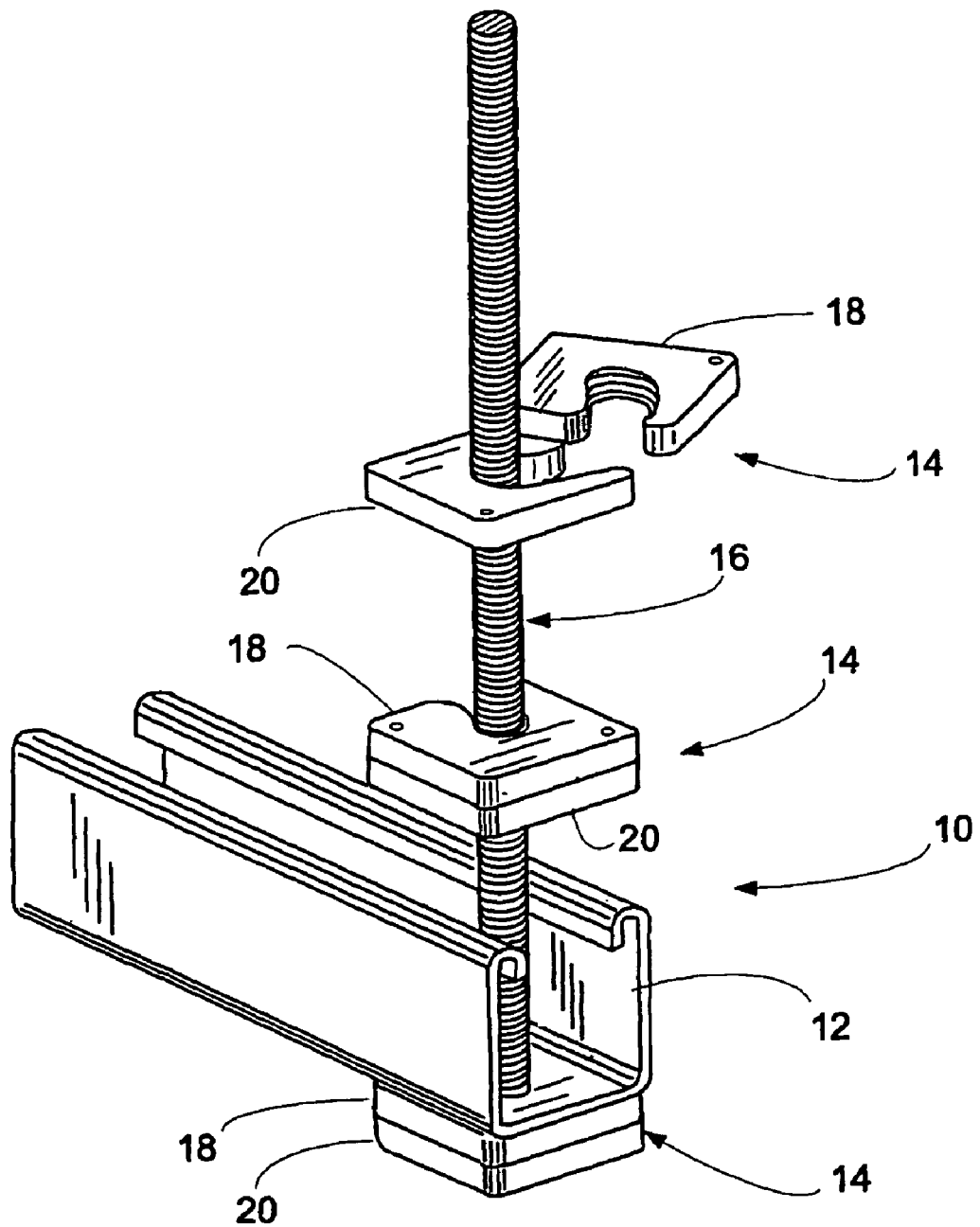
FIG. 1 is a perspective view of a portion of a strut rack system utilizing an interlocking strut member and three trapeze hangers of a preferred apparatus embodiment in various positions along the steps of a preferred method embodiment in accordance with the present invention.

Referring to the drawings by numerals of reference, there is shown in FIG. 1, a preferred strut rack assembly 10 which utilizes a strut 12 and a trapeze hanger 14 of the present invention. The trapeze hanger 14, as shown in FIG. 1, includes two rectangular body portions 18 and 20 which overlap one another and have thin profile disc-shaped portions. In FIG. 1, the uppermost trapeze hanger 14 is shown in an open configuration and the lower trapeze hanger 14 is shown in the closed position.

Figure 2:
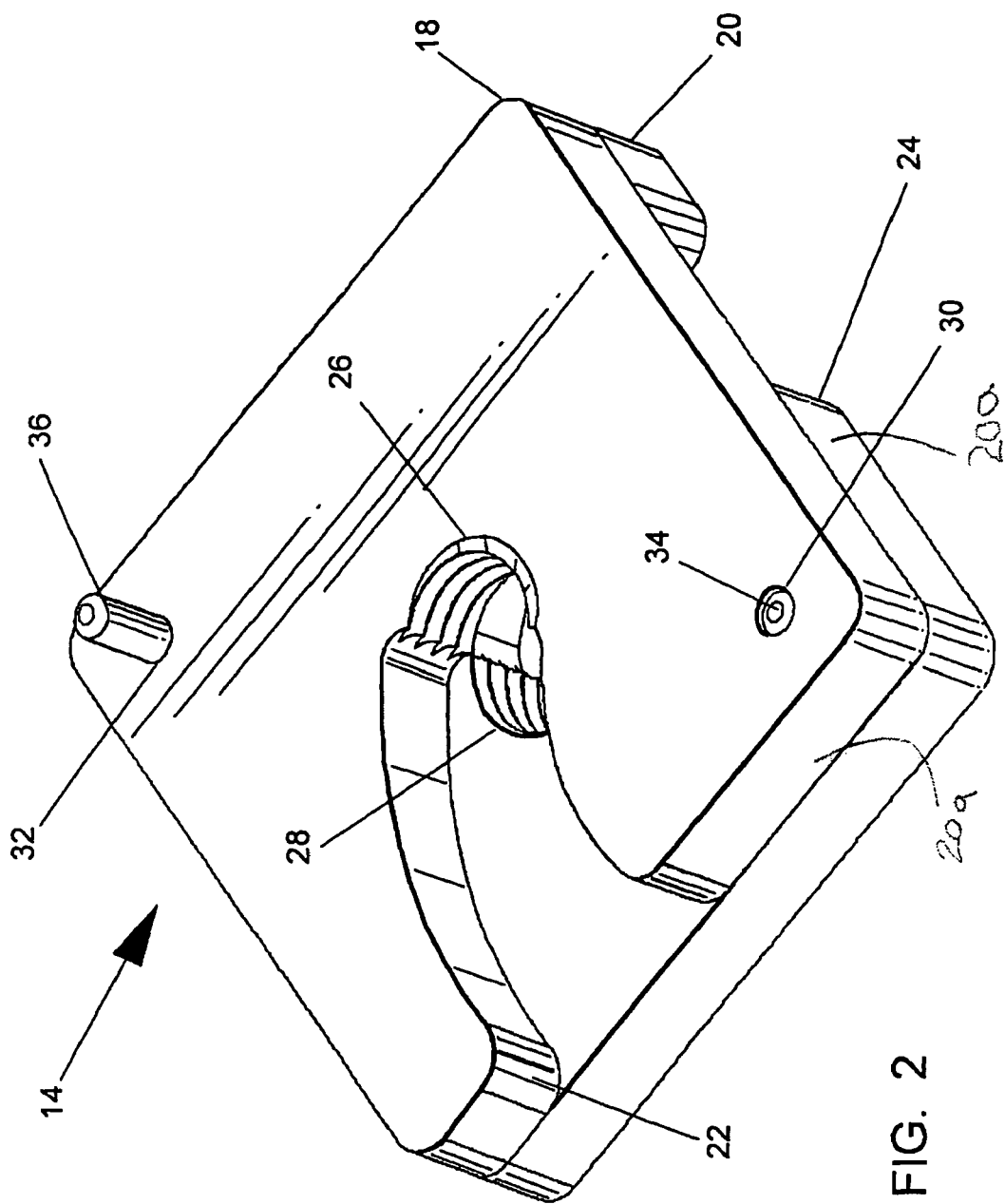
FIG. 2 is a perspective view of the trapeze hanger of the present invention as shown in FIG. 1 in a closed position.

FIG. 2 shows the two body portions 18 and 20 of the trapeze hanger 14 in a closed position. As can be seen, the top body portion 18 and the bottom body portion 20 each has a thin planar rectangular profile shape with a perimetrical vertical side edge 20a. Each of these rectangular body portions 18 and 20 include recessed apertures, 22 and 24 respectively, extending inwardly from the side edge 20a. The recessed apertures 22 and 24 are specifically configured to insertably accommodate the diameter of the threaded rod 16 shown in FIG. 1.

The rectangular profile as shown in FIG. 2, provides for side edge 20a with surfaces which can buttress against other architectural devices. The rectangular profile also provides for upper surface which supports struts and other parts. This rectangular profile generally conforms to the cross-sectional shape of strut 12.

Figure 5:
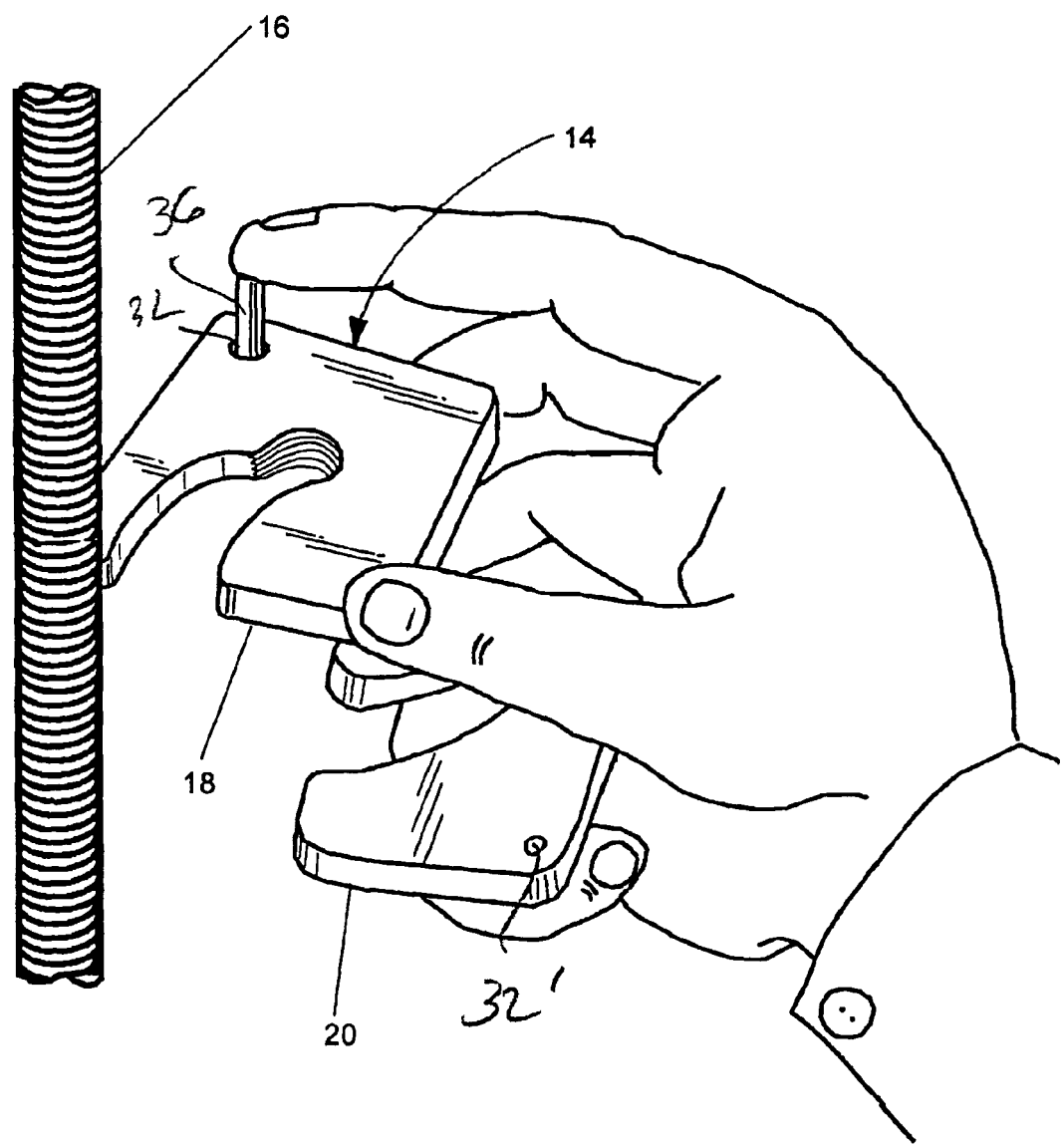
FIG. 5 is a perspective view of an installation step of the preferred embodiment of FIG. 1 in accordance with the present invention.

Further, as can be seen more readily in FIGS. 2 and 5, each of the recessed apertures 22 and 24 has a wider expanse at its opening at side edge 20a. The wider expanse gradually narrows to center threaded inner portions 26 and 28 to define a tapered guide section. Such wider access expanse of the apertures 22 and 24 easily accommodates the diameter of the threaded rod 16 and guides the threaded rod 16 to the center threaded inner portion 26 and 28 during an effortless clamping action.

In addition, the body portions 18 and 20 include pivot holes 30 and 30' provided adjacent to an end corner of the rectangular body for accommodating a hinge pin 34. Similarly, the body portions 18 and 20 also include fastening holes 32 and 32', located at the opposite end corner for accommodating a pin-shaped fastener or a fastening pin 36. The fastening pin 36 together with the pivotal pin 34 allow the hanger 14 to be moved between an open configuration and a closed configuration. Further, as shown in FIG. 2, the hinge pin 34 and the pin-shaped fastener 36 are identical and can be manufactured with same specification, thereby saving manufacturing cost.

It should be understood that other types of fasteners other than the pins may be used to secure the body portions 18 and 20 together. For example, a bolt may be inserted through holes provided in each body and a nut installed on one end. Further, a projection and a recess combination may be utilized as well.

As can be seen in FIG. 5, the body portions 18 and 20 are constructed in a non-coplanar manner to allow rotation of the body portions against each other in a complete 360 degree turn without obstructing one another. Such feature allows the installer to rotate the body portions easily in a non-latched position and latch it against the threaded rod 16 later during installation. Further, as FIG. 5 shows, the installer can grab the trapeze hanger 14, open, place next to a threaded rod, rotate, clamp, and fasten it to a closed position with only one hand at hard to reach places or tight spaces demanding hand dexterity.

Figure 3:
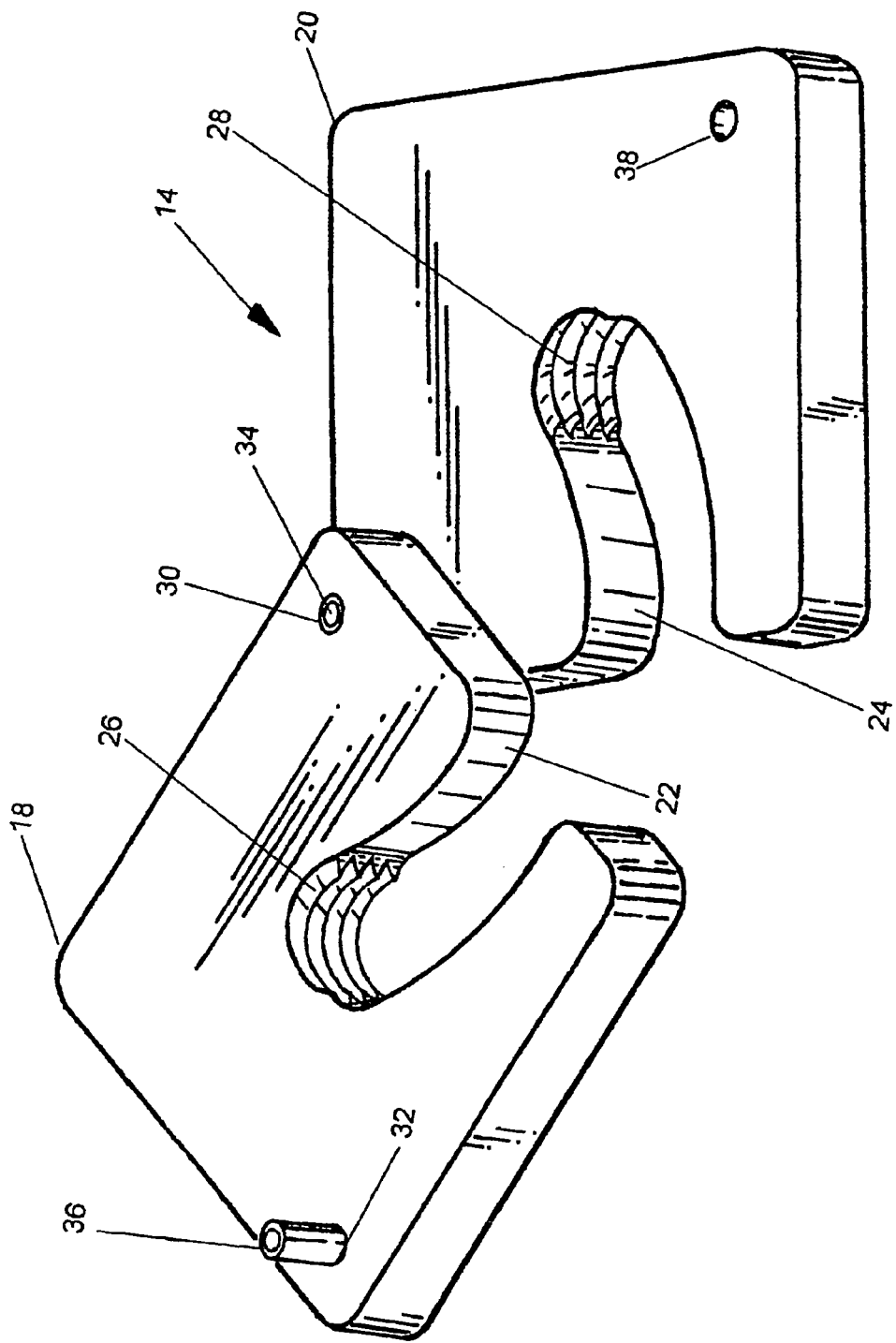
FIG. 3 is another perspective view of the trapeze hanger as shown in FIG. 2 in an open position.

FIG. 3 shows an open position of the preferred embodiment where the recess apertures 22 and 24 come together to clasp around the threaded rod 16 (not shown). Because of the open and closed position feature of the preferred split nut embodiment as shown in FIGS. 2 and 3, an installer can suspend a strut rack assembly from one or more vertically threaded rods without passing the assembly over the ends of the threaded rods so as to permit quick and easy installation and removal. This greatly reduces the time and labor required to assemble, install, disassemble, and modify a suspended existing strut rack system.

Also, as can be seen in FIG. 3, each of the rectangular body portions 18 and 20 is non-coplanar as mentioned above. As none of the vertical edges of the rectangular body portions 18 and 20 abuts against each other, the components are less likely to rust and corrode. When the trapeze hanger 14 must be removed or its position changed, such design makes it easier to remove the rectangular body portions 18 and 20.

Also seen in FIG. 3, the rectangular body portions 18 and 20 are identical components which provide for manufacturing expediency. In essence, if the top body 18 was flipped over, the fastening hole 38 would be exactly at same position as the fastening hole position of the bottom body 20. Further, the inner portions 26, 28 of each body portion includes threads which are identical at corresponding positions.

The trapeze hanger of the present invention may be assembled in the following manner. The trapeze hanger body portions 18 and 20 may be placed together and the hinge pin 34 is tapped into the pivot hole 30 through two stacked rectangular body portions 18 and 20. The body portions 18 and 20 are then oriented and the fastening pin 36 is totally inserted in one body portion 18 to define a hinged pair of body portions 18 and 20 with fastening pin allowing the pivotal opening and closing of the trapeze hanger 18 around the threaded rod 16.

The trapeze hangers, manufactured as described above, can be produced from metal, hardened plastic, or elastomer. Further, such trapeze hangers can be manufactured by different processes, extrusions, machining, or stamping or combinations of any previously described processes. It is contemplated that the hanger 14 may be plated for corrosion resistance.

Figure 4:
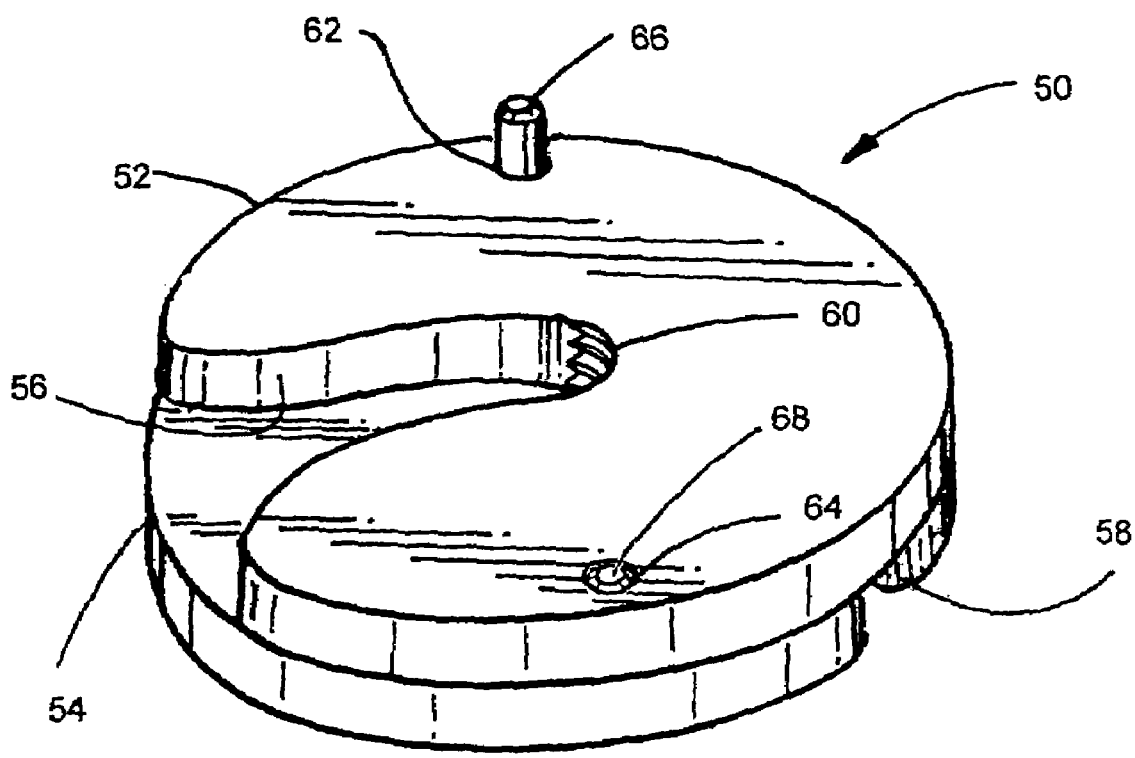
FIG. 4 is a perspective view of another preferred embodiment of the present invention.

Alternatively, the profile of the present invention can encompass any other shape such as a completely round profile as shown in FIG. 4. Specifically, FIG. 4 shows a second embodiment of the trapeze hanger 50 of the present invention. In contrast to the previous embodiment, the second embodiment 50 includes a circular disc top 52 and a circular similarly shaped disc bottom 54. Each of these discs 52 and 54, includes a wider access expanse of the aperture, 56 and 58 respectively, that tapers to a center threaded inner portion, 60 and 60' respectively (not shown) and accommodates the diameter of the threaded rod 16 (not shown) to the center threaded inner portion, 60, 60' during an effortless clamping action. A pivot hole 64 and 64' (not shown) is provided on the top surface of each disc 52, 54, adjacent to its perimeter, to accommodate a hinge pin 68. Correspondingly, a fastening hole 62 and 62' (not shown) is provided on the top surface of each disc 52, 54, adjacent to its perimeter, opposite the pivot hole positions, to accommodate a fastening pin 66. Similar to the first embodiment described above, the second embodiment also shows that the hinge pin 68 and the fastening pin 66 as well as the discs 52 and 54 are identical. Additionally, the round trapeze hanger 50 as shown can have a "flat" portion not shown or other gripping features so that it can be rotated by a tool. The "flat" portion or any other gripping feature may be placed 180 degrees apart from each other. Alternatively, the present invention can also include a hexagon or an octagon profile or any other shape or profile as can be appreciated by a person skilled in the art.

Referring now to FIGS. 1 and 5, the trapeze hanger 14 is used to support a strut member 12 forming a suspended strut rack assembly 10. The strut members 12 may have transverse slots formed when they are manufactured. Alternatively, the strut members may be without slots and the slots may be formed in the strut at the job site to correspond to the size and spacing of the existing threaded rods.

The strut member 12 has an inwardly rolled top edge which extends longitudinally the length of the strut. Any number of clamps, framing, or straps (not shown) may be interconnected to the rolled top edge to provide any different number of architectural configurations.

Installation

Having described the physical attributes of the trapeze hanger, a preferred installation method shall be described. As can be seen in FIG. 1, the trapeze hanger 14 is installed on a vertical threaded rod 16 at the appropriate location by opening the pair of body portions 18 and 20. Then, the wide recess opening 22 of the rectangular metal body portions 18 is placed around the shaft of the threaded rod 16. The installer then clasps the two body portions 18 and 20 together, thereby guiding the threaded rod 16 into the threaded inner member 26 and 28. The installer then tightens the internal threaded portions around the shaft of the threaded rod. Once this is completed, the installer then installs the fastener pin into the fastening pin holes 32, 32' to maintain the trapeze hanger in a threaded engagement as a single rotatable unit with the threaded rod 16. The assembled trapeze hanger can then be moved up or down on the threaded rod 16 in the conventional manner to a desired position. The trapeze hanger may be received beneath the lower strut member 12 as shown in FIG. 1 at level to support the strut member.

The trapeze hanger 14 may be turned by hand or with a wrench to adjust its height or the level of the assembled strut. The steps are then repeated to install additional strut assemblies on other threaded rods 16 to form a plurality of generally parallel spaced strut assemblies capable of receiving and supporting pipes, cables, and the like thereon.

When it becomes necessary to remove the pipe strut assembly, the trapeze hanger 14 can be quickly removed by unfastening the pin 36 and opening the body portions 18 and 20 of the trapeze hanger 14, allowing the assembled strut to slide off the end of the threaded rods 16. If there is an obstruction beneath the strut assembly, the bolts can be undone by allowing the strut members to be separated and removed laterally from the threaded rods 16.

The above described apparatus and method provides a strut rack system which may be installed as original equipment to become the primary strut rack or may be easily and quickly installed as an intermediate or upper rack above existing strut racks without the necessity of removing any members already in place.

While this invention has been described fully and completely with special emphasis upon a preferred embodiment, it should be understood that within the scope of the appended claims, the invention may be practiced otherwise than as specifically described herein.

What is claimed is:

1. A hanger for supporting a strut to a threaded support rod, the hanger comprising:
    a pair of planar hanger portions, each hanger portion including an access opening extending from a side edge thereof and including an internally threaded portion for insertable accommodation of said threaded rod;
    said hanger portions being pivotally interconnected defining an open position for placement about said threaded rod and a closed position defining a threaded aperture for threadedly receiving said rod; and
    said hanger portions in said closed position being rotatably movable along said rod for supporting engagement with said strut;
    wherein said hanger portions are non-coplanar in relation to each other and do not obstruct each other during installation or removal.

2. A trapeze hanger according to claim 1, further comprising:
    a pivot pin, wherein each of said hanger portions includes a pin hole to accommodate said pin and to allow said hanger portions to pivot against each other.

3. A trapeze hanger according to claim 2, further comprising:
    a fastening pin, wherein each of said hanger portions includes a second pin hole for accommodating said pin for fastening said hanger portions with each other at a clasped position around the threaded rod, wherein same pin profile is used interchangeably as a fastener and a hinge for assembly.

4. A trapeze hanger according to claim 1, wherein said hanger portions are identically shaped.

5. A trapeze hanger according to claim 1, wherein said hanger portions have a rectangular support body to maximize a load on the trapeze hanger or buttress against other architectural members to prevent rotation of the trapeze hanger.

6. A trapeze hanger according to claim 1, wherein said access aperture adjacent to said edges is configured with a wider space than the diameter of said threaded portion defining a gradually narrowing tapered guide accommodating said threaded rod.

7. A trapeze hanger according to claim 1, wherein each of said hanger portions has a flat top profile with an area dimension that is substantially larger than the thickness of said side edges.

8. A trapeze hanger according to claim 1, wherein each of said hanger portions has a round circular support body.

9. An interlocking support hanger for rotationally attaching to a threaded rod, the support hanger comprising:
    a first hanger portion including a first pivot hole and an opening at an edge thereof leading to an open thread configured to engage and twist around the vertical threaded rod;
    a second hanger portion including a second pivot hole and a second opening at an edge thereof leading to another open thread configured to engage and twist around the vertical threaded rod; and
    a pivoting pin inserted into said first and said second pivot holes to place said hanger portions in a non-coplanar configuration, allowing rotation of said first hanger portion against said second hanger portion in a complete 360 degree turn.

10. An interlocking suspension support hanger according to claim 9, further comprising:

a fastening pin, wherein each of said hanger portions includes a pin hole for accommodating said fastening pin and fastening said hanger portions with each other at a clasped position around the threaded rod, wherein said fastening pin and said pivoting pin are interchangeable.

11. An interlocking suspension support hanger according to claim 9, wherein said hanger portions are identically shaped.

12. An interlocking suspension support hanger according to claim 9, wherein each of said hanger portions has a rectangular support body to maximize a load on the support body or buttress against other architectural members.

13. An interlocking suspension support hanger according to claim 9, wherein said access aperture adjacent to said edges is configured with a wider space than the diameter of said threaded portion defining a gradually narrowing guide accommodating said threaded rod.

14. An interlocking suspension support hanger according to claim 9, wherein each of said hanger portions has a round circular support body.

15. A method of supporting a strut having a threaded rod extending therethrough, the method comprising the steps of:

providing a pair of pivotally connected planar hanger portions, each hanger portion including an access opening extending from a side edge to a threaded internal portion and being in non-coplanar configuration;

pivoting said hanger portions about said threaded rod to place said hanger portions in threaded engagement with said rod; and rotating said pair of hanger portions against one another into supporting engagement with said strut.

16. A method according to claim 15, wherein said pair of hanger portions are each provided with an identical pivoting hole and a fastening hole, and each of two interchangeable pins is inserted into each said pivoting hole and each said fastening hole respectively.

17. A method according to claim 15, wherein each of said hanger portions has a rectangular support body to maximize a load on the support body or buttress against other architectural members.

18. A method according to claim 15, wherein said of said hanger portions are constructed to allow rotation of said hanger portions in a complete 360 degree turn.

* * * * *